United States Patent
Bhat et al.

(10) Patent No.: US 10,572,365 B2
(45) Date of Patent: Feb. 25, 2020

(54) VERIFICATION FOR DEVICE MANAGEMENT

(71) Applicant: Nutanix, Inc., San Jose, CA (US)

(72) Inventors: Ashish Bhat, Milpitas, CA (US); Ravikanth Samprathi, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 174 days.

(21) Appl. No.: 15/839,150

(22) Filed: Dec. 12, 2017

(65) Prior Publication Data

US 2018/0173604 A1    Jun. 21, 2018

Related U.S. Application Data

(60) Provisional application No. 62/434,991, filed on Dec. 15, 2016.

(51) Int. Cl.
*G06F 11/36* (2006.01)
*G06F 11/34* (2006.01)
(Continued)

(52) U.S. Cl.
CPC ............ *G06F 11/3466* (2013.01); *G06F 8/71* (2013.01); *G06F 9/45558* (2013.01);
(Continued)

(58) Field of Classification Search
CPC .................. G06F 11/3466; G06F 11/3668
(Continued)

(56) References Cited

U.S. PATENT DOCUMENTS 8,549,518 B1   10/2013   Aron et al.
8,601,473 B1   12/2013   Aron et al.
(Continued)

FOREIGN PATENT DOCUMENTS

CN    108055327 A  *  5/2018

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
(Continued)

*Primary Examiner* — Chae M Ko
(74) *Attorney, Agent, or Firm* — Foley & Lardner LLP

(57) ABSTRACT

A method of eliminating false positives when testing a device management platform for controlling endpoints. The method includes sending, by a computing device, a request to a cloud controller to create an entity. The request causes operations including i) creating, by an endpoint responsive to a receipt of an interface request from the cloud controller, the entity, ii) receiving, by the cloud controller from the endpoint, response data generated by the entity, the response data indicating the creation of the entity, and iii) generating, by the cloud controller, control data based on the response data. The method includes receiving the control data from the cloud controller; sending, responsive to the receipt of the control data, a call to the endpoint for entity data; receiving entity data from the endpoint; comparing, the response data to the entity data to validate the response data; and generating a test status.

30 Claims, 4 Drawing Sheets

(51) Int. Cl.
*G06F 9/50* (2006.01)
*G06F 9/455* (2018.01)
*G06F 8/71* (2018.01)

(52) U.S. Cl.
CPC ........ *G06F 9/5077* (2013.01); *G06F 11/3692* (2013.01); *G06F 2009/45562* (2013.01); *G06F 2009/45591* (2013.01)

(58) Field of Classification Search
USPC .................................................. 714/38.1, 39
See application file for complete search history.

(56) References Cited

U.S. PATENT DOCUMENTS

| | | | |
|---|---|---|---|
| 8,850,130 | B1 | 9/2014 | Aron et al. |
| 9,772,866 | B1 | 9/2017 | Aron et al. |
| 9,935,818 | B1* | 4/2018 | Kim .................... H04L 41/0645 |
| 2012/0311128 | A1* | 12/2012 | Pechanec ............ G06F 11/3414 709/224 |
| 2015/0350102 | A1* | 12/2015 | Leon-Garcia ........... H04L 41/12 709/226 |
| 2016/0094410 | A1* | 3/2016 | Anwar ................ H04L 67/1095 709/223 |
| 2016/0364307 | A1* | 12/2016 | Garg ....................... G06F 11/26 |
| 2017/0141962 | A1* | 5/2017 | Britt ....................... G06F 9/5072 |
| 2018/0121335 | A1* | 5/2018 | Cillis ................... G06F 11/3684 |
| 2018/0121822 | A1* | 5/2018 | Aghasaryan ........... G06N 7/005 |
| 2019/0018703 | A1* | 1/2019 | Sedovic ................ G06F 9/4843 |

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.

* cited by examiner

VERIFICATION FOR DEVICE MANAGEMENT

CROSS REFERENCE TO RELATED APPLICATION

This application claims priority to U.S. Provisional Application 62/434,991, filed Dec. 15, 2016, incorporated by reference in its entirety.

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

SUMMARY

Aspects of the present disclosure relate generally to a platform for controlling entities, and more particularly to a system and method of eliminating false positives when testing a device management platform for controlling endpoints.

One implementation disclosed herein is a method of eliminating false positives when testing a device management platform for controlling endpoints. The method includes sending, by a computing device, a request to a cloud controller to create an entity. In some implementations, the request causes operations including i) creating, by an endpoint responsive to a receipt of an interface request from the cloud controller, the entity, ii) receiving, by the cloud controller from the endpoint, response data generated by the entity, the response data indicating the creation of the entity, and iii) generating, by the cloud controller, control data based on the response data. In some implementations, the method includes receiving, by the computing device, the control data from the cloud controller. In some implementations, the method includes sending, by the computing device responsive to the receipt of the control data, a call to the endpoint for entity data. In some implementations, the method includes receiving, by the computing device, entity data from the endpoint. In some implementations, the method includes comparing, by the computing device, the response data to the entity data to validate the response data. In some implementations, the method includes generating, by the computing device responsive to the comparison, a test status.

In some implementations, receipt of the control data comprises receiving the control data via a control channel of the cloud controller. In some implementations, the control channel of the cloud controller comprises at least one of a web-based user-interface, a command-line interface (CLI), and a representational state transfer (REST) application specific interface (API). In some implementations, the endpoint is managed by the cloud controller. In some implementations, the cloud controller sends the interface request using an application specific interface (API) exposed by the entity.

In some implementations, sending the call to the endpoint for the entity data includes sending, by the computing device, the call to the endpoint via a first direct-connection between the computing device and the endpoint. In some implementations, the method includes receiving, by the computing device, the entity data via a second direct-connection between the computing device and the endpoint.

In some implementations, the computing device sends the call for the entity data to the endpoint via a first communication path, and wherein the computing device receives the entity data from the endpoint via a second communication path. In some implementations, the method includes comparing the response data to the entity data includes determining, by the computing device, an absence of a match of the response data to the entity data. In some implementations, the method includes generating, by the computing device responsive to the absence, a failing test status. In some implementations, the cloud controller comprises an OpenStack software platform. In some implementations, generating the control data comprises querying an activity of the entity.

In another aspect, the present disclosure is directed to a system for eliminating false positives when testing a device management platform for controlling endpoints. The system including a computing device configured to send a request to a cloud controller to create an entity. The request causes i) an endpoint to create, responsive to a receipt of an interface request from the cloud controller, the entity, ii) the cloud controller to receive, from the endpoint, response data generated by the entity, the response data indicating the creation of the entity, and iii) the cloud controller to generate control data based on the response data. In some implementations, the system including a computing device configured to receive the control data from the cloud controller. In some implementations, the system including a computing device configured to send, responsive to the receipt of the control data, a call to the endpoint for entity data. In some implementations, the system including a computing device configured to receive entity data from the endpoint. In some implementations, the system including a computing device configured to compare the response data to the entity data to validate the response data. In some implementations, the system including a computing device configured to generate, responsive to the comparison, a test status In some implementations, the request further causes the cloud controller to send, via a control channel of the cloud controller, the control data to the computing device. In some implementations, the control channel of the cloud controller comprises at least one of a web-based user-interface, a command-line interface (CLI), and a representational state transfer (REST) application specific interface (API). In some implementations, the endpoint is managed by the cloud controller.

In some implementations, the request further causes the cloud controller to send the interface request using an application specific interface (API) exposed by the entity. In some implementations, the computing device further configured to send the call to the endpoint via a first direct-connection between the computing device and the endpoint. In some implementations, the computing device further configured to receive the entity data via a second direct-connection between the computing device and the endpoint.

In some implementations, the computing device further configured to send the call to the endpoint via a first communication path. In some implementations, the computing device further configured receive the entity data from the endpoint via a second communication path. In some implementations, the computing device further configured to determine an absence of a match of the response data to the entity data. In some implementations, the computing device further configured to generate, responsive to the absence, a failing test status. In some implementations, the request further causes the cloud controller to generate the control data by querying an activity of the entity.

In another aspect, the present disclosure is directed to a non-transitory computer readable storage medium to store a computer program configured to execute a method for eliminating false positives when testing a device management platform for controlling endpoints, the method including sending, by a computing device, a request to a cloud controller to create an entity. The request causes operations comprising i) creating, by an endpoint responsive to a receipt of an interface request from the cloud controller, the entity, ii) receiving, by the cloud controller from the endpoint, response data generated by the entity, the response data indicating the creation of the entity, and iii) generating, by the cloud controller, control data based on the response data. In some implementations, the method includes receiving, by the computing device, the control data from the cloud controller. In some implementations, the method includes sending, by the computing device responsive to the receipt of the control data, a call to the endpoint for entity data.

BRIEF DESCRIPTION OF THE DRAWINGS

Illustrative embodiments will hereafter be described with reference to the accompanying drawings.

Like reference numbers and designations in the various drawings indicate like elements.

DETAILED DESCRIPTION

Figure 1A:
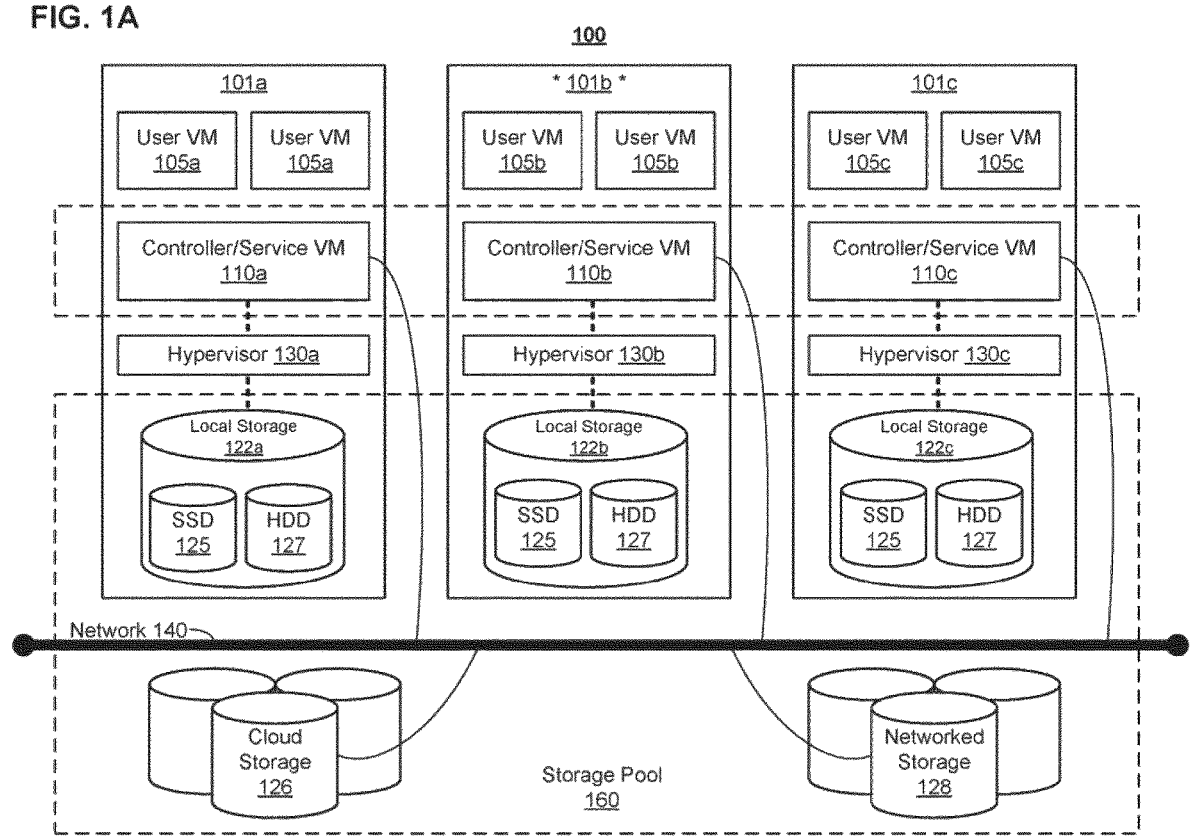
FIG. 1A illustrates a clustered virtualization environment 100 according to particular embodiments.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A illustrates a clustered virtualization environment 100 according to particular embodiments. The architecture of FIG. 1A can be implemented for a distributed platform that contains multiple host machines 101 *a-c* that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122*a-c* that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101 a-c may run virtualization software, such as VMWARE ESX(I), MICROSOFT HYPER-V, or REDHAT KVM. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
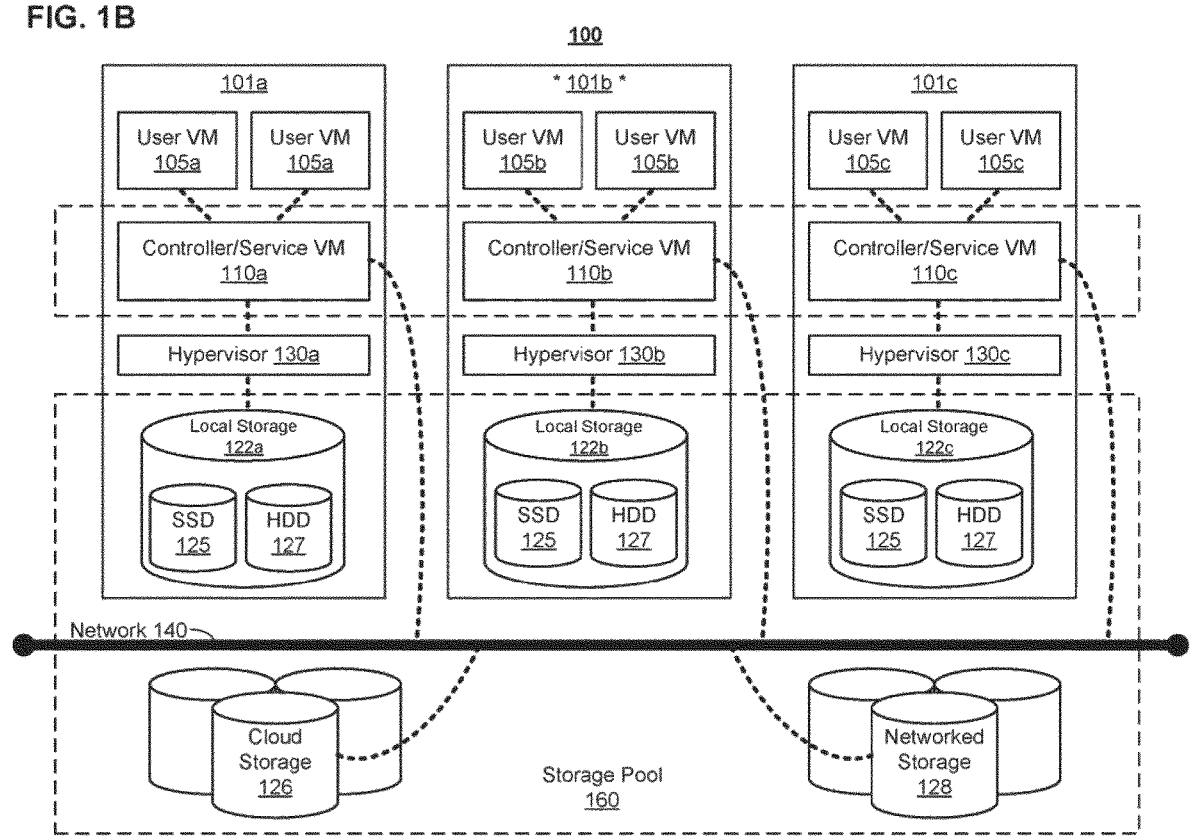
FIG. 1B illustrates data flow within an example clustered virtualization environment 100 according to particular embodiments.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via network 140 to cloud storage 126 or NAS 128, or by connecting via network 140 to local storage 122b-c within another host machine 101b-c (e.g., via connecting to another CVM 110b or 110c). In particular embodiments, any suitable computing system 300 may be used to implement a host machine 101.

PAT-75: Particular embodiments may provide validation and verification for a platform for controlling entities (e.g., pools of compute, storage, and networking resources), such as OPENSTACK. For such device management platforms that only provide an API for testing through one control channel (e.g., either web-based UI, command-line interface (CLI), or REST APIs), particular embodiments provide a verification mechanism that retrieves data directly from an entity using an API exposed by the entity itself. By comparing the data retrieved through the platform's control channel with the data retrieved directly from the entity, particular embodiments may realize advantages such as, by way of example and not limitation, eliminating false positives that may arise when using platform-only API-based testing (e.g., where OPENSTACK updates its database with the necessary action but the entity might not be updated with the value).

Figure 2A:
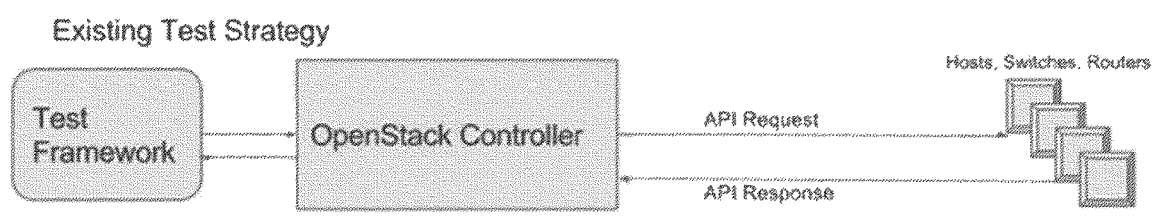
FIG. 2A is a schematic illustrating a current approach testing frameworks by sending an API query through the OPENSTACK APIs, receiving the result back from the OPENSTACK APIs, and validating the results for the respective test.
Figure 2B:
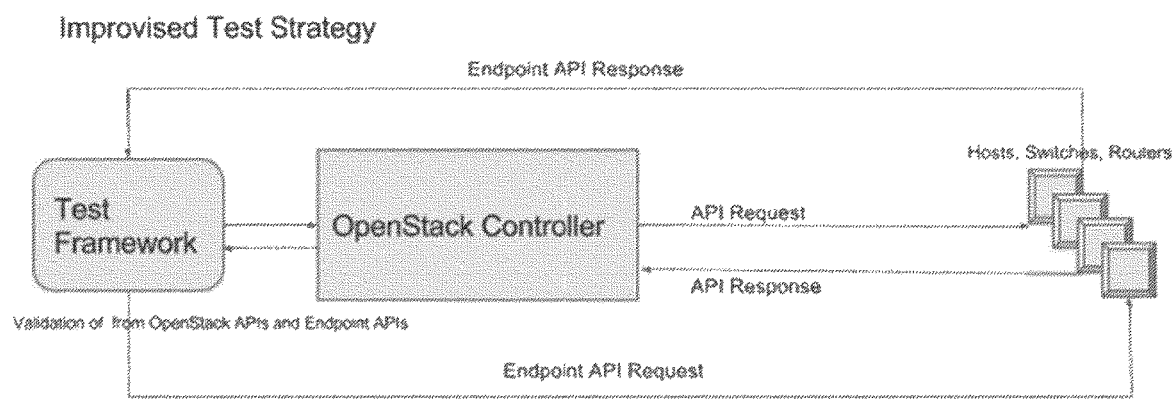
FIG. 2B is a schematic illustrating an improvised test strategy by particular embodiments of a test framework that sends an API query to OPENSTACK and to the endpoint managed by OPENSTACK.

FIG. 2A is a schematic illustrating a current approach testing frameworks by sending an API query through the OPENSTACK APIs, receiving the result back from the OPENSTACK APIs, and validating the results for the respective test. FIG. 2B is a schematic illustrating an improvised test strategy by particular embodiments of a test framework that sends an API query to OPENSTACK and to the endpoint managed by OPENSTACK. When results are returned from both methods, the test framework compares and validates the results for the respective test.

Figure 3:
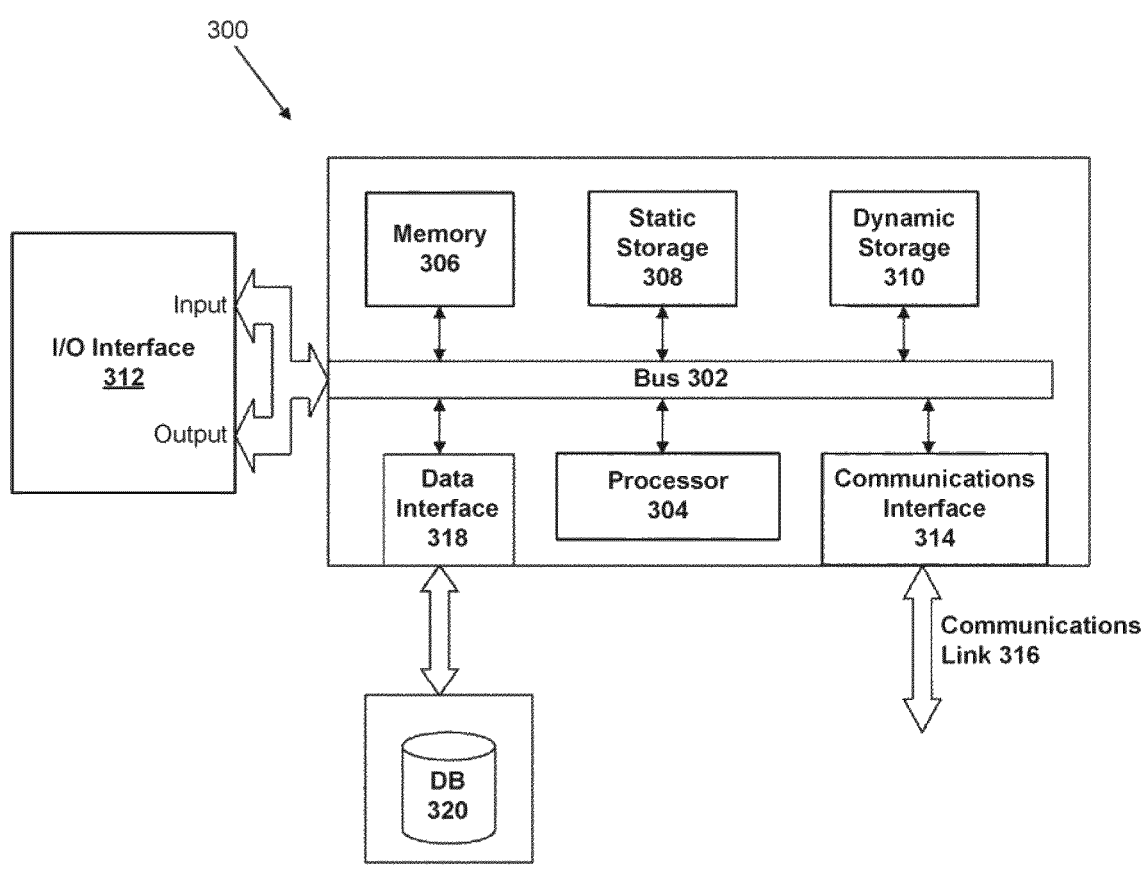
FIG. 3 is a block diagram of an illustrative computing system 300 suitable for implementing particular embodiments.

FIG. 3 is a block diagram of an illustrative computing system 300 suitable for implementing particular embodiments. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

Computer system 300 includes a bus 302 (e.g., an address bus and a data bus) or other communication mechanism for communicating information, which interconnects subsystems and devices, such as processor 304, memory 306 (e.g., RAM), static storage 308 (e.g., ROM), dynamic storage 310 (e.g., magnetic or optical), communication interface 314 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 312 (e.g., keyboard, keypad, mouse, microphone). In particular embodiments, computer system 300 may include one or more of any such components.

In particular embodiments, processor 304 includes hardware for executing instructions, such as those making up a computer program. As an example and not by way of limitation, to execute instructions, processor 304 may retrieve (or fetch) the instructions from an internal register, an internal cache, memory 306, static storage 308, or dynamic storage 310; decode and execute them; and then write one or more results to an internal register, an internal cache, memory 306, static storage 308, or dynamic storage 310. In particular embodiments, processor 304 may include one or more internal caches for data, instructions, or addresses. This disclosure contemplates processor 304 including any suitable number of any suitable internal caches, where appropriate. As an example and not by way of limitation, processor 304 may include one or more instruction caches, one or more data caches, and one or more translation lookaside buffers (TLBs). Instructions in the instruction caches may be copies of instructions in memory 306, static storage 308, or dynamic storage 310, and the instruction caches may speed up retrieval of those instructions by processor 304. Data in the data caches may be copies of data in memory 306, static storage 308, or dynamic storage 310 for instructions executing at processor 304 to operate on; the results of previous instructions executed at processor 304 for access by subsequent instructions executing at processor 304 or for writing to memory 306, static storage 308, or dynamic storage 310; or other suitable data. The data caches may speed up read or write operations by processor 304. The TLBs may speed up virtual-address translation for processor 304. In particular embodiments, processor 304 may include one or more internal registers for data, instructions, or addresses. This disclosure contemplates processor 304 including any suitable number of any suitable internal registers, where appropriate. Where appropriate, processor 304 may include one or more arithmetic logic units (ALUs); be a multi-core processor; or include one or more processors 302. Although this disclosure describes and illustrates a particular processor, this disclosure contemplates any suitable processor.

In particular embodiments, I/O interface 312 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 312 for them. Where appropriate, I/O interface 312 may include one or more device or software drivers enabling processor 304 to drive one or more of these I/O devices. I/O interface 312 may include one or more I/O interfaces 312, where appropriate. Although this disclosure describes and illustrates a particular I/O interface, this disclosure contemplates any suitable I/O interface.

In particular embodiments, communication interface 314 includes hardware, software, or both providing one or more interfaces for communication (such as, for example, packet-based communication) between computer system 300 and one or more other computer systems 300 or one or more networks. As an example and not by way of limitation, communication interface 314 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 314 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 314 for any of these networks, where appropriate. Communication interface 314 may include one or more communication interfaces 314, where appropriate. Although this disclosure describes and illustrates a particular communication interface, this disclosure contemplates any suitable communication interface.

One or more memory buses (which may each include an address bus and a data bus) may couple processor 304 to memory 306. Bus 302 may include one or more memory buses, as described below. In particular embodiments, one or more memory management units (MMUs) reside between processor 304 and memory 306 and facilitate accesses to memory 306 requested by processor 304. In particular embodiments, memory 306 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 306 may include one or more memories 306, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 310 may include a hard disk drive (HDD), a floppy disk drive, flash memory, an optical disc, a magneto-optical disc, magnetic tape, or a Universal Serial Bus (USB) drive or a combination of two or more of these. Dynamic storage 310 may include removable or non-removable (or fixed) media, where appropriate. Dynamic storage 310 may be internal or external to computer system 300, where appropriate. This disclosure contemplates mass dynamic storage 310 taking any suitable physical form. Dynamic storage 310 may include one or more storage control units facilitating communication between processor 304 and dynamic storage 310, where appropriate.

In particular embodiments, bus 302 includes hardware, software, or both coupling components of computer system 300 to each other. As an example and not by way of limitation, bus 302 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 302 may include one or more buses 306, where appropriate. Although this disclosure describes and illustrates a particular bus, this disclosure contemplates any suitable bus or interconnect.

According particular embodiments, computer system 300 performs specific operations by processor 304 executing one or more sequences of one or more instructions contained in memory 306. Such instructions may be read into memory 306 from another computer readable/usable medium, such as static storage 308 or dynamic storage 310. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 304 for execution. Such a medium may take many forms, including but not limited to, nonvolatile media and volatile media. Non-volatile media includes, for example, optical or magnetic disks, such as static storage 308 or dynamic storage 310. Volatile media includes dynamic memory, such as memory 306.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 300; in alternative embodiments, two or more computer systems 300 coupled by communication link 316 (e.g., LAN, PTSN, or wireless network) may perform the sequence of instructions in coordination with one another.

Computer system 300 may transmit and receive messages, data, and instructions, including program, i.e., application code, through communication link 316 and communication interface 314. Received program code may be executed by processor 304 as it is received, and/or stored in static storage 308 or dynamic storage 310, or other non-volatile storage for later execution. A database 320 may be used to store data accessible by the system 300 by way of data interface 318.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for controlling endpoints, the method comprising:
   sending, by a computing device, a request to a cloud controller to create an entity, the request causing operations comprising i) creating, by an endpoint responsive to a receipt of an interface request from the cloud controller, the entity, ii) receiving, by the cloud controller from the endpoint, response data generated by the entity, the response data indicating the creation of the entity, and iii) generating, by the cloud controller, control data based on the response data;
   receiving, by the computing device, the control data from the cloud controller;
   sending, by the computing device responsive to a second receipt of the control data, a call to the endpoint for entity data;
   receiving, by the computing device, entity data from the endpoint;
   comparing, by the computing device, the response data to the entity data to validate the response data; and
   generating, by the computing device responsive to the comparison, a status.

2. The method of claim 1, wherein the second receipt of the control data comprises receiving the control data via a control channel of the cloud controller.

3. The method of claim 2, wherein the control channel of the cloud controller comprises at least one of a web-based user-interface, a command-line interface (CLI), and a representational state transfer (REST) application specific interface (API).

4. The method of claim 1, wherein the endpoint is managed by the cloud controller.

5. The method of claim 1, wherein the cloud controller sends the interface request using an application specific interface (API) exposed by the entity.

6. The method of claim 1, wherein sending the call to the endpoint for the entity data comprises:
   sending, by the computing device, the call to the endpoint via a first direct-connection between the computing device and the endpoint; and
   receiving, by the computing device, the entity data via a second direct-connection between the computing device and the endpoint.

7. The method of claim 1, wherein the computing device sends the call for the entity data to the endpoint via a first communication path, and wherein the computing device receives the entity data from the endpoint via a second communication path.

8. The method of claim 1, wherein comparing the response data to the entity data comprises:
   determining, by the computing device, an absence of a match of the response data to the entity data; and
   generating, by the computing device responsive to the absence, a failing status.

9. The method of claim 1, wherein the cloud controller comprises an OpenStack software platform.

10. The method of claim 1, wherein generating the control data comprises querying an activity of the entity.

11. A system for controlling endpoints, the system comprising a computing device configured to:
    send a request to a cloud controller to create an entity, the request causes i) an endpoint to create, responsive to a receipt of an interface request from the cloud controller, the entity, ii) the cloud controller to receive, from the endpoint, response data generated by the entity, the response data indicating the creation of the entity, and iii) the cloud controller to generate control data based on the response data;
    receive the control data from the cloud controller;
    send, responsive to a second receipt of the control data, a call to the endpoint for entity data;
    receive entity data from the endpoint;
    compare the response data to the entity data to validate the response data; and
    generate, responsive to the comparison, a status.

12. The system of claim 11, wherein the request further causes:
    the cloud controller to send, via a control channel of the cloud controller, the control data to the computing device.

13. The system of claim 12, wherein the control channel of the cloud controller comprises at least one of a web-based user-interface, a command-line interface (CLI), and a representational state transfer (REST) application specific interface (API).

14. The system of claim 11, wherein the endpoint is managed by the cloud controller.

15. The system of claim 11, wherein the request further causes:
    the cloud controller to send the interface request using an application specific interface (API) exposed by the entity.

16. The system of claim 11, wherein the computing device further configured to:
    send the call to the endpoint via a first direct-connection between the computing device and the endpoint; and
    receive the entity data via a second direct-connection between the computing device and the endpoint.

17. The system of claim 11, wherein the computing device further configured to:
    send the call to the endpoint via a first communication path; and
    receive the entity data from the endpoint via a second communication path.

18. The system of claim 11, wherein the computing device further configured to:

determine an absence of a match of the response data to the entity data; and generate, responsive to the absence, a failing status.

19. The system of claim 11, wherein the request further causes:

the cloud controller to generate the control data by querying an activity of the entity.

20. The system of claim 11, wherein the cloud controller comprises an OpenStack software platform.

21. A non-transitory computer readable storage medium to store a computer program configured to execute a method for controlling endpoints, the method comprising:

sending, by a computing device, a request to a cloud controller to create an entity, the request causing operations comprising i) creating, by an endpoint responsive to a receipt of an interface request from the cloud controller, the entity, ii) receiving, by the cloud controller from the endpoint, response data generated by the entity, the response data indicating the creation of the entity, and iii) generating, by the cloud controller, control data based on the response data;

receiving, by the computing device, the control data from the cloud controller;

sending, by the computing device responsive to a second receipt of the control data, a call to the endpoint for entity data;

receiving, by the computing device, entity data from the endpoint;

comparing, by the computing device, the response data to the entity data to validate the response data; and generating, by the computing device responsive to the comparison, a status.

22. The storage medium of claim 21, wherein the second receipt of the control data comprises receiving the control data via a control channel of the cloud controller.

23. The storage medium of claim 21, wherein the control channel of the cloud controller comprises at least one of a web-based user-interface, a command-line interface (CLI), and a representational state transfer (REST) application specific interface (API).

24. The storage medium of claim 21, wherein the endpoint is managed by the cloud controller.

25. The storage medium of claim 21, wherein the cloud controller sends the interface request using an application specific interface (API) exposed by the entity.

26. The storage medium of claim 21, wherein sending the call to the endpoint for the entity data comprises:

sending, by the computing device, the call to the endpoint via a first direct-connection between the computing device and the endpoint; and receiving, by the computing device, the entity data via a second direct-connection between the computing device and the endpoint.

27. The storage medium of claim 21, wherein the computing device sends the call for the entity data to the endpoint via a first communication path, and wherein the computing device receives the entity data from the endpoint via a second communication path.

28. The storage medium of claim 21, wherein comparing the response data to the entity data comprises:

determining, by the computing device, an absence of a match of the response data to the entity data; and generating, by the computing device responsive to the absence, a failing status.

29. The storage medium of claim 21, wherein the cloud controller comprises an OpenStack software platform.

30. The storage medium of claim 21, wherein generating the control data comprises querying an activity of the entity.

* * * * *